(12) United States Patent
Desorbay et al.

(10) Patent No.: US 9,307,576 B2
(45) Date of Patent: Apr. 5, 2016

(54) CORE NETWORK INTERFACE FOR PACKET DOMAIN FOR UMA UNC APPLICATIONS

(71) Applicant: Alcatel Lucent, Paris (FR)

(72) Inventors: Eric Desorbay, Campbon (FR); Pulin Patel, McKinney, TX (US); Olivier Huard, Cholet (FR)

(73) Assignee: Alcatel Lucent, Boulogne-Billancourt (FR)

( * ) Notice: Subject to any disclaimer, the term of this patent is extended or adjusted under 35 U.S.C. 154(b) by 290 days.

(21) Appl. No.: 13/647,675

(22) Filed: Oct. 9, 2012

(65) Prior Publication Data
US 2013/0028173 A1 Jan. 31, 2013

Related U.S. Application Data

(63) Continuation of application No. 13/095,435, filed on Apr. 27, 2011, now abandoned, which is a continuation of application No. 11/914,181, filed as application No. PCT/EP2006/005307 on Apr. 3, 2006.

(60) Provisional application No. 60/680,586, filed on May 13, 2005.

(51) Int. Cl.
*H04W 92/02* (2009.01)
*H04W 88/14* (2009.01)
(Continued)

(52) U.S. Cl.
CPC .............. *H04W 92/02* (2013.01); *H04W 88/14* (2013.01); *H04W 88/16* (2013.01); *H04W 92/14* (2013.01); *H04W 92/24* (2013.01)

(58) Field of Classification Search
CPC ..... H04W 92/02; H04W 92/14; H04W 92/24; H04W 88/14; H04W 88/16

USPC .......................................................... 370/352
See application file for complete search history.

(56) References Cited

U.S. PATENT DOCUMENTS

2005/0169207 A1* 8/2005 Muniere ........................ 370/328
2005/0265279 A1* 12/2005 Markovic et al. ............. 370/328
(Continued)

FOREIGN PATENT DOCUMENTS

WO 03/105380 A1 12/2003

OTHER PUBLICATIONS

3GPP TR 43.901 V2.1.0 Aug. 2004 Technical Report—Siemens—3rd Generation Partnershipo Project Technical Specification Group GERAN Feasibility Study on Generic Access to A/GB Interface (Release 6).
(Continued)

*Primary Examiner* — Paul H Masur
(74) *Attorney, Agent, or Firm* — Chiesa Shahinian & Giantomasi PC

(57) ABSTRACT

An UMA network controller is dedicated for an UMA mobile network including a CS core network and a PS core network with a SGSN. The UMA network controller includes a security gateway and a control means coupled to one another. The security gateway is arranged i) to ensure security procedures between mobile stations and the UMA world, ii) to forward messages relative to the control plane for the packet switched core network between mobile stations and the control means, and iii) to forward messages relative to the user plane for the packet switched core network between mobile stations and the a serving GPRS support node. The control means is intercalated between the security gateway and the serving GPRS support node and arranged for handling the control plane for the packet switched core network.

5 Claims, 3 Drawing Sheets

(51) Int. Cl.
*H04W 88/16* (2009.01)
*H04W 92/14* (2009.01)
*H04W 92/24* (2009.01)

(56) References Cited

U.S. PATENT DOCUMENTS

2005/0271008 A1* 12/2005 Gallagher et al. ............ 370/329
2006/0114870 A1* 6/2006 Buckley et al. ............... 370/338
2006/0114871 A1* 6/2006 Buckley et al. ............... 370/338
2006/0116125 A1* 6/2006 Buckley et al. ............. 455/435.1
2006/0209799 A1* 9/2006 Gallagher et al. ............ 370/352
2006/0250955 A1* 11/2006 Kallio .......................... 370/229

OTHER PUBLICATIONS

International Search Report for PCT/EP2006/005307 dated Sep. 15, 2006.

* cited by examiner

CORE NETWORK INTERFACE FOR PACKET DOMAIN FOR UMA UNC APPLICATIONS

CROSS-REFERENCE TO RELATED APPLICATIONS

This application is a continuation of U.S. application Ser. No. 13/095,435 filed Apr. 27, 2011, now abandoned, which is a continuation of U.S. application Ser. No. 11/914,181 filed Nov. 12, 2007, which is a national stage entry of PCT/EP2006/005307 filed Apr. 3, 2006, which is based on U.S. provisional patent application No. 60/680,586 filed May 13, 2005, the disclosures of which are hereby incorporated by reference thereto in their entirety, and the priority of which is hereby claimed under 35 U.S.C. §119 and §120.

BACKGROUND OF THE INVENTION

1. Field of the Invention

The present invention relates to the domain of mobile (or cellular) communication networks, and more precisely to mobile communication networks of the UMA (Unlicensed Mobile Access) or GAN (Generic Access Network) type, notably defined by the technical specifications of the 3GPP TS 43.318 v6.4.0, "Generic access to the A/Gb interface— stage 2" (release 6), and TS 44.318 v6.3.0—"Generic Access (GA) to the A/Gb interface, Mobile GA interface layer 3 specification" (Release 6).

2. Description of the Prior Art

As it is known by the man skilled in the art, an UMA network must comprise UMA access node called UNC (UMA Network Controller) to interface with serving GPRS support node(s) (SGSN) belonging to its packet switched (PS) core network and also with mobile switching center(s) (MSC) belonging to its circuit switched (CS) core network and.

In order a mobile station could exchange data with the UMA network, a permanent TCP (Transmission Control Protocol) connection must be established with an UNC, through which the CS and PS protocols are supported, after an authorization phase. Since a TCP connection is natively a transport connection oriented protocol, an UNC is a standalone machine supporting altogether CS and PS services, according to the 3GPP UMA standard.

From a network topology perspective, an UNC is comparable to a GERAN BSC (GSM EDGE Radio Access Network Base Station Controller) as it offers access to a core network by means of A and Gb interfaces respectively for CS and PS core network parts.

A BSC of a GERAN necessitates solid CPU capacities to handle radio resource management algorithms and plays a role of concentration node in a TDM transmission network organized with base stations (BTSs) in a star configuration. Therefore altogether for CPU reasons and transmission network organization, the BSCs are very justified as dedicated access network nodes.

An UMA access network having a number of specificities compared to a GERAN network, an UNC i) must have much less CPU requirements as it does not handle radio resource management algorithms with complex radio optimization features, ii) is merely a protocol gateway function for the CS core network part and a forwarding machine for the PS core network part, and iii) supports WiFi access point through a native IP network and therefore is not subject to any topology constraints linked to TDM transmission network.

So, even though an UNC stands as a BSC in a GERAN model, it has little to do with a radio communication equipment and is more a core network type node as it is a kind of access server combined with a protocol relay and a traffic forwarder.

SUMMARY OF THE INVENTION

So, the object of this invention is to improve the situation by providing for an improved core network interface for packet domain.

For this purpose, it provides an UMA network controller (UNC) for an UMA mobile communication network comprising a circuit switched core network and a packet switched core network with at least one serving GPRS support node (SGSN).

This UMA network controller (UNC) is characterized in that it comprises a security gateway (SGW) and a control means coupled one to the other.

The SGW is arranged i) to ensure security procedures between mobile stations and the UMA world, ii) to forward messages relative to the control plane for at least the packet switched core network between mobile stations and the control means, iii) to forward messages relative to the user plane for at least the packet switched core network between mobile stations and the serving GPRS support node (SGSN).

The control means is intercalated between the SGW and the SGSN and arranged for handling the control plane for at least the packet switched core network.

The UMA network controller according to the invention may include additional characteristics considered separately or combined, and notably:

- it further comprises a media gateway (MGW) coupled to its SGW and to the circuit switched core network, and its SGW may be further arranged i) to forward messages relative to the control plane for the circuit switched core network between mobile stations and the control means, and ii) to forward messages relative to the user plane for the circuit switched core network between mobile stations and the MGW. In this case the control means is intercalated between the SGW and a mobile switching center (MSC) and arranged i) for handling the control plane for the circuit switched core network and discovery and registration procedures of the mobile stations, and ii) for relaying circuit switched call messages between the MSC and the mobile stations through the SGW;
- the control means may comprise a packet switched part coupled to the SGSN, and a circuit switched part coupled to the MSC and to this packet switched part and arranged for forwarding packet switched call messages over TCP between the packet switched part and the mobile stations through the SGW;
- the packet switched part and the circuit switched part may be arranged to exchange messages through at least one TCP path, or another transport path, such as an UDP path for instance (one means here by "transport path" a path associated to a transport (or transmission) protocol);
- the control means may be arranged to exchange information elements, relative to the IP address and communication port number of the mobile station and to the IP address and communication port number of the SGSN, with this SGSN.

BRIEF DESCRIPTION OF THE DRAWINGS

Other features and advantages of the invention will become apparent on examining the detailed specifications hereafter and the appended drawings, wherein.

The appended drawings may not only serve to complete the invention, but also to contribute to its definition, if need be.

DETAILED DESCRIPTION OF THE INVENTION

In the following description it will be considered that the mobile network is of the GPRS type and comprises an UMA core network.

Figure 1:
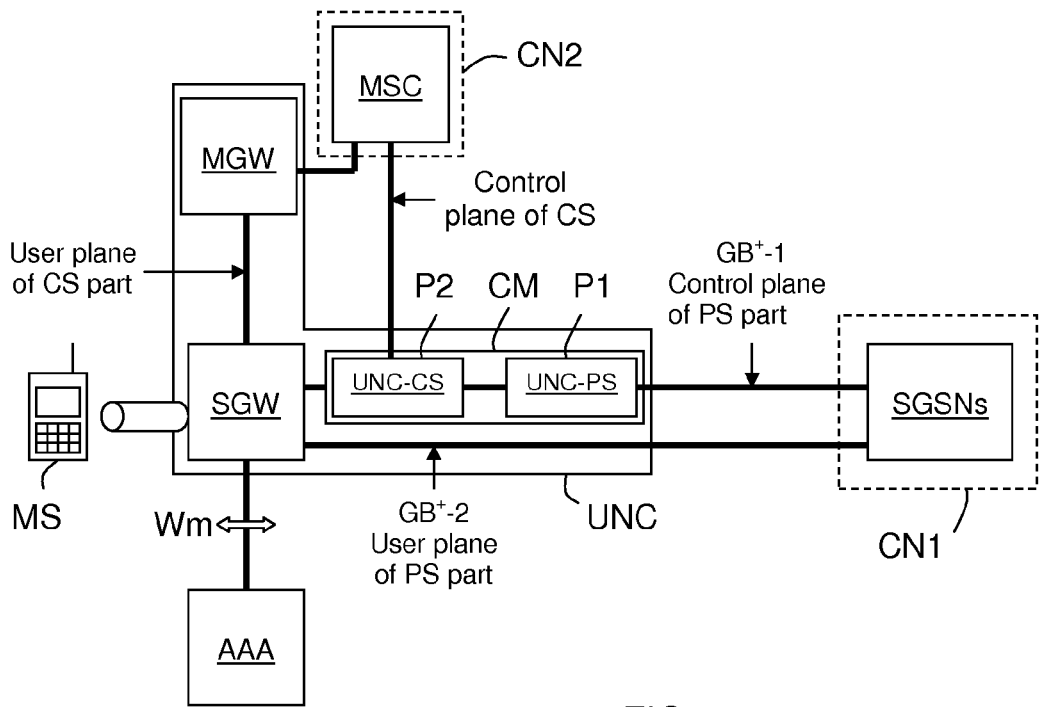
FIG. 1 schematically illustrates an example of a part of an UMA mobile network comprising an UMA network controller according to the invention, FIG. 2 schematically illustrates the main steps of a successful mobile station initiated transport channel (TC) activation, FIG. 3 schematically illustrates the main steps of a successful mobile station initiated transport channel (TC) deactivation, and FIG. 4 schematically illustrates the main steps of a successful SGSN initiated transport channel (TC) activation.

As it is schematically illustrated in FIG. 1, an UMA mobile communication network comprises notably a packet switched (PS) core network CN1, a circuit switched (CS) core network CN2 and at least one UMA network controller UNC comprising a security gateway SGW, a control module CM and a media gateway MGW.

The packet switched core network CN1 comprises notably at least one serving GPRS support node SGSN coupled to at least one UMA network controller UNC. The circuit switched core network CN2 comprises notably a mobile switching center MSC coupled to the control module CM and to the media gateway MGW.

According to the invention, the Security Gateway SGW is coupled to the media gateway MGW and to the control module CM. It is arranged to implement at least three main functionalities.

Its first functionality consists in ensuring the classical and well-known security procedures (authentication, encryption and interaction with a server AAA dedicated to authentication, authorization and accounting) between the mobile stations MS and the UMA world.

Its second functionality consists in forwarding the URR (UMA Radio Resources) and URLC (UMA Radio Link Control) messages over TCP connection between the mobile stations MS and the control module CM. In other words, it forwards the messages relative to the control plane for at least the packet switched core network CN1.

Its third functionality consists in forwarding the URLC messages over UDP between the mobile stations MS and at least one serving GPRS support node SGSN through the security gateway SGW. In other words, it forwards the messages relative to the user plane for the packet switched core network CN1.

According to the invention, the control module CM is at least connected to the security gateway SGW and to at least one SGSN. It has at least one main functionality consisting in handling the control plane for at least the packet switched core network CN1. More precisely, it handles the control plane for the packet switched (PS) core network CN1, through packet switched call messages over TCP connexions, in order to allow interworking between URLC and BSSGP (Base Station System GPRS Protocol). So, it forwards the URLC messages over transport connexions between at least one SGSN and the mobile stations MS through the security gateway SGW.

It results from the above described functionalities that the control module CM of the UNC handles at least all the UMA signalisation over TCP (i.e. URLC/TCP) relative to the mobile stations MS for the packet switched core network CN1, while the SGSN handles the UMA user plane over UDP (i.e. URLC/UDP) for the packet switched core network CN1.

According to the invention the user plane (URLC) extends up to the SGSN (in other words URLC/UDP ends into (or is running into) SGSN). So a signalisation support is required onto the control plane of the Gb interface. For this purpose the invention proposes to adapt the well-known Gb interface (between an UNC and a SGSN) in order to define a new interface hereafter called Gb$^+$. More precisely, the Gb$^+$ interface is the Gb interface enriched with information elements essential to exchange the addresses and port numbers of the IP endpoints (as will be detailed below).

As it is illustrated in FIG. 1, this Gb$^+$ interface can be seen as two sub-interfaces: a first one called Gb$^+$-1 defined between the control module CM and the SGSN and dedicated to the PS control plane and a second one Gb$^+$-2 defined between the SGW and the SGSN and dedicated to the PS user plan.

The SGW is further arranged to perform two additional functionalities which are not concerned by the invention.

The first additional functionality consists in forwarding the circuit switched data (such as voice over IP) between the mobile stations MS and the media gateway MGW. In other words, it forwards the messages relative to the user plane for the circuit switched core network CN2.

The second additional functionality consists in forwarding messages relative to the control plane for the circuit switched core network CN2 between the mobile stations MS and the control module CM.

So, the control module CM also further handles the control plane for the circuit switched core network CN2. In other words, it relays the circuit switched call messages between the mobile switching center MSC and the mobile stations MS through the security gateway SGW.

As it is illustrated in FIG. 1, the control module CM may comprise a packet switched part P1 (or UNC-PS) coupled to the SGSN, and a circuit switched part P2 (or UNC-CS) coupled to the packet switched part P1 (and also to the MSC).

The packet switched part P1 implements every above mentioned PS functionalities.

The circuit switched part P2 implements every above mentioned CS functionalities and an additional one consisting in forwarding the URLC packet switched call messages over transport connexions between the packet switched part P1 and the mobile stations MS through the SGW. In other words, it forwards the messages relative to the control plane for the packet switched core network CN1.

The packet switched part P1 and the circuit switched part P2 may be arranged to exchange messages through at least one TCP path, or another transport path, such as an UDP path for instance (one means here by "transport path" a path associated to a transport (or transmission) protocol).

When the control module CM comprises a packet switched part P1 and a circuit switched part P2, the transport (or transmission) protocol used between these parts P1 and P2 may be TCP or UDP, for instance.

As mentioned before, the invention proposes a Gb$^+$ interface defined from a well-known Gb interface enriched with information elements essential to exchange the addresses of the IP endpoints and more precisely the IP addresses (IP@) and UDP port numbers. These information elements are preferably exchanged through Packet Flow Control (PFC) messages (request and acknowledgment).

Figure 2:
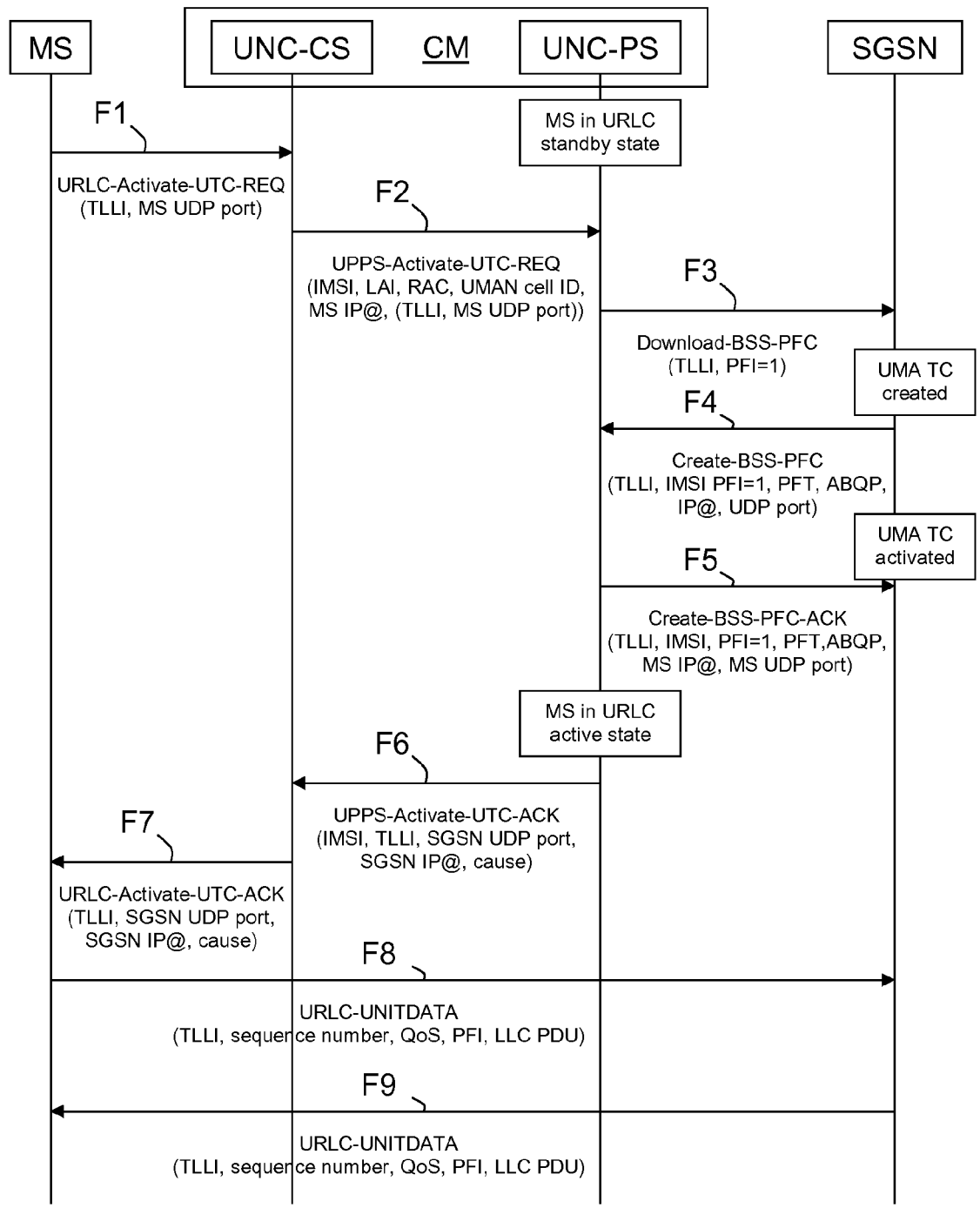

Reference is now made to FIG. 2 to describe the main steps of a non limiting example of a successful transport channel (TC) activation initiated by a mobile station MS.

A TC activation may be performed according to one of three modes: a first one comprising a Gb+ separate micro flow negotiation and a TC binding, a second one comprising a Gb+ concatenated resource reservation and a TC binding, a third one comprising only a TC binding.

When a mobile station MS wants to activate a transport channel (TC), it generates a classical activation request, in a first step F1. This request is a message such as "URLC-Activate-UTC-REQ" whose parameters are the signalling address for communication between the mobile station MS and a SGSN (TLLI—Temporary Logical Link Identifier) and the UDP port number of the mobile station (MS UDP port). This message is transmitted to the SGW by the concerned mobile station MS, and the SGW forwards it to the control module CM of its UNC.

At this stage the mobile station MS is in an URLC standby state.

Then in a second step F2 the control module CM (and more precisely its circuit switched part P2 (or UNC-CS) if it exists) transforms (encapsulates) the received URLC activation request in an UPPS activation request. For instance this request is a message such as "UPPS-Activate-UTC-REQ" whose parameters are the ones contained into the URLC request (TLLI and MS UDP port) and additional ones (IMSI, LAI, RAC, UMAN cell ID and MS IP@).

It is recalled that:
IMSI means International Mobile Subscriber Identity,
LAI means Location Area Identification (defined in the technical specification TS 24.008 of the 3GPP),
RAC means Routing Area Code,
UMAN means UMA Network
MS IP@ means IP address of the mobile station.

The circuit switched part P2 (or UNC-CS) transmits this message to the associated packet switched part P1 (or UNC-PS).

When the packet switched part P1 (or UNC-PS) receives an encapsulated URLC message from the circuit switched part P2 (or UNC-CS), a PS context attached to the mobile station MS is either created or updated with location information. Then it stores in the mobile station context several information contained into the received message: the IMSI, the UMAN Cell Identity, the Routing Area Identity (which is the concatenation of the UMAN Location Area Identification and the UMAN Routing Area Code) and the TLLI.

In a third step F3 the packet switched part P1 generates a Packet Flow Control (PFC) message intended for the SGSN to which it is coupled to. For instance this message is a "Download-BSS-PFC" message whose parameters are the TLLI contained into the received UPPS request and the Packet Flow Identifier (PFI, which is set to 1). PFI is set to 1 in order to differentiate the UMA case from a classical case (with a dedicated message this field would be omitted). This message is intended for creating an UMA transport channel (TC) between the mobile station MS and the packet switched core network CN1.

The packet switched part P1 (or UNC-PS) transmits this PFC message to the SGSN.

Then the SGSN creates the required UMA transport channel (TC) and generates, in a fourth step F4, a new PFC message for transmitting its information elements. For instance this PFC message is a "Create-BSS-PFC" message comprising the SGSN information elements to exchange (SGSN IP address (IP@) and SGSN UDP port number (UDP port)), and the parameters (TLLI, IMSI, PFI=1, PFT, ABQP), where PFT means Packet Flow Timer and ABQP means Aggregate BSS QoS Profile. PFT is used to configure the transport channel inactivity timer in UMA (the UNC sends an URR REGISTER UPDATE DOWNLINK message to the mobile station MS if the timer value has changed from the value given at registration).

The SGSN transmits this PFC message to the control module CM and more precisely to its packet switched part P1 (or UNC-PS).

In a fifth step F5 the packet switched part P1 (or UNC-PS) activates the UMA transport channel (TC) and generates a new PFC message for transmitting the information elements of the mobile station MS which required this UMA transport channel (TC) activation to the SGSN. For instance this PFC message is a "Create-BSS-PFC-ACK" message comprising the mobile station information elements to exchange (MS IP address (MS IP@) and MS UDP port number (MS UDP port)), and the parameters (TLLI, IMSI, PFI=1, PFT, ABQP).

Then in a sixth step the packet switched part P1 (or UNC-PS) generates an UPPS message for transmitting the received SGSN information elements to the associated circuit switched part P2 (or UNC-CS). For instance this request is a message such as "UPPS-Activate-UTC-ACK" comprising the SGSN information elements to exchange (SGSN IP address (SGSN IP@) and SGSN UDP port number (SGSN UDP port)), and the parameters (TLLI, IMSI, cause).

In a seventh step F7 the circuit switched part P2 (or UNC-CS) transforms the received UPPS message in an URLC message for transmitting the received SGSN information elements to the mobile station MS through the SGW. This request is a message such as "URLC-Activate-UTC-ACK" comprising the SGSN information elements to exchange (SGSN IP address (SGSN IP@) and SGSN UDP port number (SGSN UDP port)), and the parameters (TLLI, cause). Then the SGW forwards this URLC message to the concerned mobile station MS.

After this seventh step F7 the transport channel (TC) is bound. So the mobile station MS and the SGSN may exchange data over the user plane.

For instance in an eighth step F8 the mobile station MS generates an URLC message for transmitting data to the SGSN through the SGW and the second part Gb+-2 of the Gb+ interface, dedicated to the PS user plane. This message is an URLC message over UDP such as "URLC-UNITDATA" comprising the parameters (TLLI, sequence number, QoS, PFI, LLC PDU). Its is recalled that LLC PDU means Logical Link Control Packet Data Unit.

For instance in a ninth step F9 the SGSN generates an URLC message for transmitting data to the mobile station MS through the second part Gb+-2 of the Gb+ interface and the SGW. This message is such as "URLC-UNITDATA" with parameters (TLLI, sequence number, QoS, PFI, LLC PDU).

It is important to notice that in the first mode (Gb+ separate micro flow (PDP) negotiation and TC binding) the mobile station MS must request GPRS service before carrying out the first step F1, i.e. before the mobile station MS asks the UMA WLAN bearer to transport all these PDPs in a transport channel (TC). For this purpose it has to ask for as many PDP contexts as necessary. So the following steps have to be carried out n times when n PDP contexts are required.

In a first step the mobile station MS sends to the SGSN a message such as "ACTIVATE PDP CTXT REQ (QoS)" defined by the technical specification of the 3GPP TS 24.008. Then, in a second step, the SGSN checks and negotiates the resources and the QoS with the BSS/UNC by means of a message such as "Create-BSS-PFC (PFI, PFT, ABQP)" defined by the technical specification of the 3GPP TS 48.018. And in a third step the SGSN sends a PDP context activation acknowledgement to the mobile station MS by means of a message such as "ACTIVATE PDP CTXT ACK (QoS, PFI)" defined by the technical specification of the 3GPP TS 24.008.

In this first mode, ABQP may be either omitted or, for instance, set to the value of the sum of the previously negotiated ABQP, in steps F4 and F5.

In the second mode (Gb+ concatenated resource reservation and TC binding) the mobile station MS must request GPRS service before carrying out the first step F1, i.e. before the mobile station MS asks the UMA WLAN bearer to transport all these PDPs in a transport channel (TC). For this purpose it has to ask for as many PDP contexts as necessary. So the following steps have to be carried out n times when n PDP contexts are required.

In a first step the mobile station MS sends to the SGSN a message such as "ACTIVATE PDP CTXT REQ (QoS)" defined by the technical specification of the 3GPP TS 24.008. Then, in a second step, the SGSN just notes the requested resources and QoS, and sends a PDP context activation acknowledgement to the mobile station MS by means of a message such as "ACTIVATE PDP CTXT ACK (QoS, PFI)" defined by the technical specification of the 3GPP TS 24.008.

In this second mode, ABQP is set to the value of the sum of the previously negotiated ABQP, in steps F4 and F5.

In the third mode (only TC binding) the mobile station MS must request GPRS service before carrying out the first step F1, i.e. before the mobile station MS asks the UMA WLAN bearer to transport all these PDP in a transport channel (TC). For this purpose it has to ask for as many PDP contexts as necessary. So the following steps have to be carried out n times when n PDP contexts are required.

In a first step the mobile station MS sends to the SGSN a message such as "ACTIVATE PDP CTXT REQ (QoS)" defined by the technical specification of the 3GPP TS 24.008. Then, in a second step, the SGSN sends a PDP context activation acknowledgement to the mobile station MS by means of a message such as "ACTIVATE PDP CTXT ACK (QoS, PFI)" defined by the technical specification of the 3GPP TS 24.008.

In this third mode, ABQP and PFT are omitted in steps F4 and F5.

It is also important to notice that dedicated messages could be used instead of the messages used in steps F4 and F5.

Figure 3:
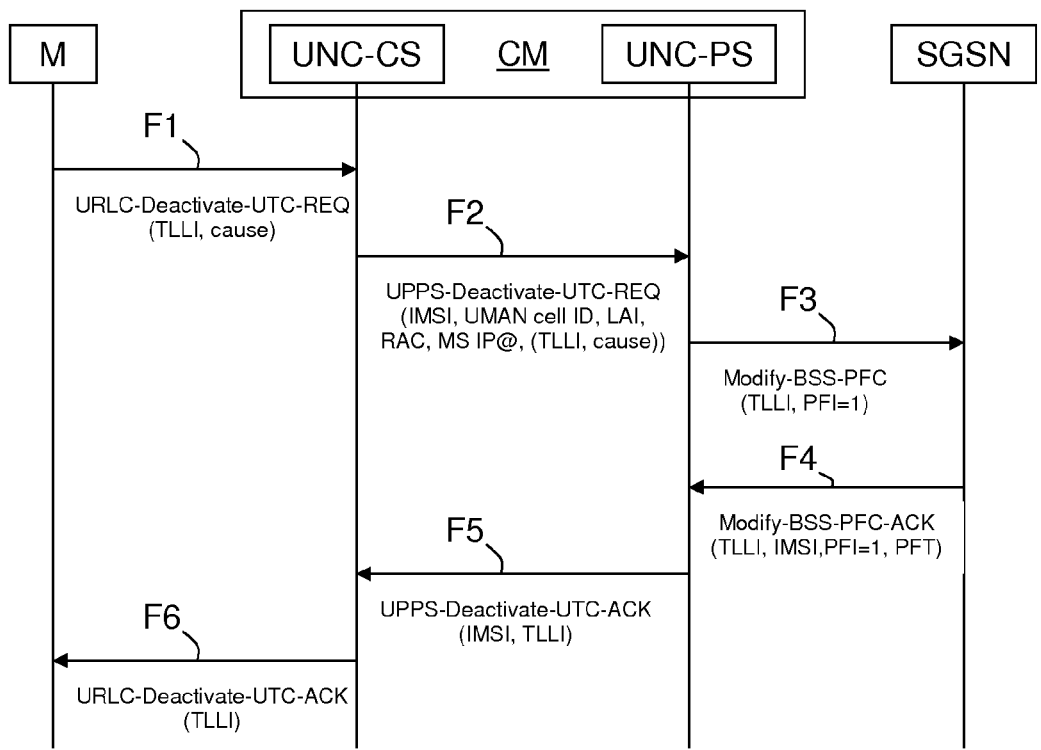

Reference is now made to FIG. 3 to describe the main steps of a non limiting example of a successful transport channel (TC) deactivation initiated by a mobile station MS.

When a mobile station MS wants to deactivate an UMA, it generates a classical transport channel (TC) deactivation request, in a first step F1. This request is a message such as "URLC-Deactivate-UTC-REQ" whose parameters are the signalling address for communication between the mobile station MS and a SGSN (TLLI) and the cause. This message is transmitted to the SGW by the concerned mobile station MS, and the SGW forwards it to the control module CM of its UNC.

Then in a second step F2 the control module CM (and more precisely its circuit switched part P2 (or UNC-CS) if it exists) transforms (encapsulates) the received URLC deactivation request in an UPPS deactivation request. For instance this request is a message such as "UPPS-Deactivate-UTC-REQ" whose parameters are the ones contained into the URLC request (TLLI, cause) and additional ones (IMSI, LAI, RAC, UMAN cell ID and MS IP@), where MS IP@ is the IP address of the mobile station.

The circuit switched part P2 (or UNC-CS) transmits this message to the associated packet switched part P1 (or UNC-PS).

In a third step F3 the packet switched part P1 generates a Packet Flow Control (PFC) message requiring deactivation of the UMA transport channel (TC) from the SGSN to which it is coupled to. For instance this message may be a "Modify-BSS-PFC" message whose parameters are the TLLI contained into the received UPPS request and the Packet Flow Identifier (PFI, which is set to 1). This message is intended for deleting an UMA transport channel (TC) with the packet switched core network CN1. Instead of a message such as "Modify-BSS-PFC", it is also possible to use a message such as "Delete-BSS-PFC".

The packet switched part P1 (or UNC-PS) transmits this PFC modification message to the SGSN.

Then in a fourth step F4 the SGSN generates a PFC message to acknowledge receipt of the PFC modification message and signalling that it has proceed to the required deactivation. For instance this PFC acknowledgement message is a "Modify-BSS-PFC-ACK" message comprising the parameters (TLLI, IMSI, PFI=1, PFT). Instead of a message such as "Modify-BSS-PFC-ACK", it is also possible to use a message such as "Delete-BSS-PFC-ACK".

The SGSN transmits this PFC message to the control module CM and more precisely to its packet switched part P1 (or UNC-PS).

In a fifth step F5 the packet switched part P1 (or UNC-PS) generates an UPPS acknowledgement message to signal that the deactivation has been carried out by the SGSN. For instance this is a message such as "UPPS-Deactivate-UTC-ACK" comprising the parameters (TLLI, IMSI).

In a sixth step F6 the circuit switched part P2 (or UNC-CS) transforms the received UPPS acknowledgement message in an URLC acknowledgement message intended for the mobile station MS. This URLC acknowledgement message is "URLC-Deactivate-UTC-ACK" comprising the parameter TLLI. Then the SGW forwards this URLC acknowledgement message to the concerned mobile station MS.

Figure 4:
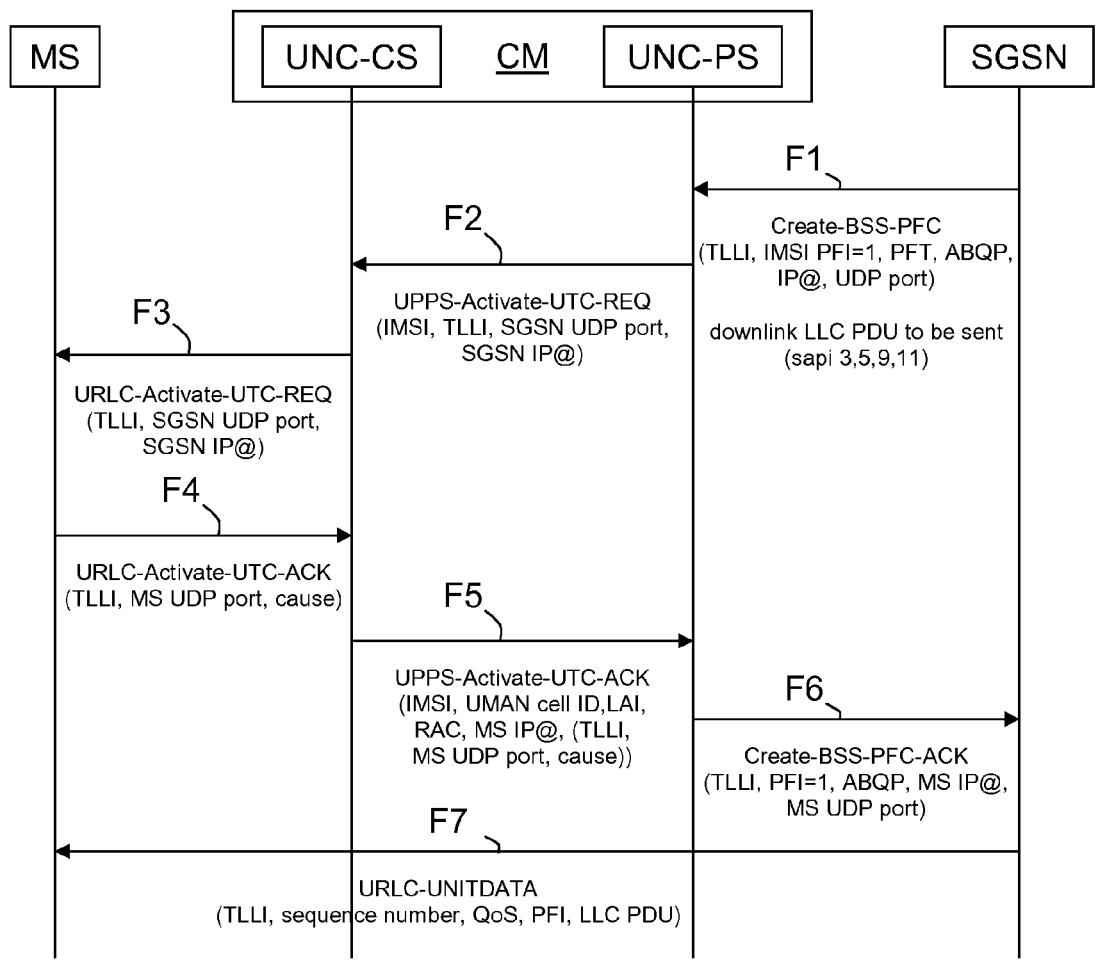

Reference is now made to FIG. 4 to describe the main steps of a non limiting example of a successful transport channel (TC) activation initiated by a SGSN.

When a SGSN wants to activate an UMA transport channel (TC) with a mobile station MS, it generates, in a first step F1, a new PFC message for transmitting its own information elements and creating a downlink LLC PDU. For instance this PFC message is a "Create-BSS-PFC" message comprising the SGSN information elements to exchange (SGSN IP address (IP@) and SGSN UDP port number (UDP port)), and parameters (TLLI, IMSI, PFI=1, PFT, ABQP).

The SGSN transmits this PFC message to the control module CM and more precisely to its packet switched part P1 (or UNC-PS).

In a second step F2 the packet switched part P1 (or UNC-PS) generates an UPPS activation message for requiring an UMA transport channel (TC) activation and transmitting the received SGSN information elements to the associated circuit switched part P2 (or UNC-CS). For instance this request is a message such as "UPPS-Activate-UTC-REQ" comprising the SGSN information elements to exchange (SGSN IP address (SGSN IP@) and SGSN UDP port number (SGSN UDP port)), and the parameters (TLLI, IMSI).

In a third step F3 the circuit switched part P2 (or UNC-CS) transforms the received UPPS activation message in an URLC activation message for requiring the UMA transport channel (TC) activation and transmitting the received SGSN information elements to the mobile station MS through the SGW. This request is a message such as "URLC-Activate-UTC-REQ" comprising the SGSN information elements to exchange (SGSN IP address (SGSN IP@) and SGSN UDP port number (SGSN UDP port)), and the parameter TLLI. Then the SGW forwards this URLC message to the concerned mobile station MS.

When it receives this URLC message the mobile station MS generates, in a fourth step F4, an activation request to acknowledge receipt of the URLC activation message and transmit to the SGSN its UDP port number and the TLLI. This request is a message such as "URLC-Activate-UTC-REQ" whose parameters are the information elements TLLI (Temporary Logical Link Identifier) and UDP port number (MS UDP port) of the mobile station, and the cause. This message is transmitted to the SGW by the concerned mobile station MS, and the SGW forwards it to the control module of its UNC.

Then in a fifth step F5 the control module CM (and more precisely its circuit switched part P2 (or UNC-CS) if it exists) transforms (encapsulates) the received URLC activation acknowledgement in an UPPS activation acknowledgement. For instance this acknowledgement is a message such as "UPPS-Activate-UTC-ACK" whose parameters are the ones contained into the URLC request (TLLI, MS UDP port and cause) and additional ones (IMSI, LAI, RAC, UMAN cell ID and MS IP@), where MS IP@ is the mobile station IP address (information element).

The circuit switched part P2 (or UNC-CS) transmits this UPPS activation acknowledgement to the associated packet switched part P1 (or UNC-PS).

In a sixth step F6 the packet switched part P1 generates a Packet Flow Control (PFC) message to acknowledge the creation of the UMA transport channel (TC). For instance this message is a "CREATE-BSS-PFC-ACK" message whose parameters are the information elements TLLI, MS IP@ and MS UDP port of the mobile station MS, contained into the received UPPS activation acknowledgement and the Packet Flow Identifier (PFI, which is set to 1), IMSI, PFT and ABQP.

After this sixth step F6 the transport channel is bound. So the mobile station MS and the SGSN may exchange data over the user plane.

For instance in a seventh step F7 the mobile station MS generates an URLC message for transmitting data to the SGSN through the second part $Gb^+$-2 of the $Gb^+$ interface, dedicated to the PS user plane, and the SGW. This message is such as "URLC-UNITDATA" with parameters (TLLI, sequence number, QoS, PFI, LLC PDU).

It is also important to notice that dedicated messages could be used instead of the messages used in steps F1 and F6.

For instance when the control module CM comprises a packet switched part P1 and a circuit switched part P2, all messages between the packet switched part P1 and the circuit switched part P2, corresponding to URR or URLC messages, contain a header (for instance encoded in "V" (fixed) format), few specific mandatory information elements with fixed length (for instance also encoded in V format), and other specific information elements (for instance encoded in TLV format).

The two parts (control module CM and SGW) defining the UMA network controller UNC according to the invention, may be realized with software modules, or hardware modules, or else a combination of hardware and software modules.

The invention is not limited to the embodiments of UMA network controller described above, only as examples, but it encompasses all alternative embodiments which may be considered by one skilled in the art within the scope of the claims hereafter.

The invention claimed is:

1. An UMA network controller for an UMA mobile communication network comprising a circuit switched core network and a packet switched core network with at least one serving GPRS support node, the UMA network controller comprising:
   a security gateway; and
   a controller coupled to said security gateway;
   said security gateway being arranged to:
      ensure security procedures between mobile stations and an UMA world;
      forward messages relative to a control plane for said packet switched core network between mobile stations and said controller; and
      forward messages relative to a user plane for the packet switched core network between mobile stations and said serving GPRS support node via a $Gb^+$-2 interface;
   wherein said controller is intercalated between said security gateway and said serving GPRS support node via a $Gb^+$-1 interface, said controller is arranged for handling the control plane for the packet switched core network, and said controller is arranged to exchange information elements, via the $Gb^+$-1 interface, relative to an IP address and a communication port number of a mobile station and to an IP address and communication port number of said serving GPRS support node, with said serving GPRS node.

2. The UMA network controller according to claim 1, further comprising:
   a media gateway coupled to said security gateway and to said circuit switched core network, said security gateway further arranged to:
   forward messages relative to the control plane for said circuit switched core network between mobile stations and said controller, and
   forward messages relative to the user plane for the circuit switched core network between mobile stations and said media gateway,
   wherein said controller is intercalated between said security gateway and a mobile switching center of said circuit switched core network, said controller arranged for:
   handling the control plane for said circuit switched core network, and discovery and registration procedures of said mobile stations, and for:
   relaying circuit switched call messages between said mobile switching center and said mobile stations through said security gateway.

3. The UMA network controller according to claim 2, said controller comprising:
   a packet switched part coupled to said serving GPRS serving node; and
   a circuit switched part coupled to said mobile switching center and to said packet switched part and arranged for forwarding packet switched call messages over TCP between said packet switched part and said mobile stations through said security gateway.

4. The UMA network controller according to claim 3, wherein said packet switched part and said circuit switched part are arranged to exchange messages through at least one transport path.

5. The UMA network controller according to claim 4, wherein said transport path is chosen from one of a TCP path or a UDP path.

* * * * *